United States Patent [19]

Devanney

[11] 4,273,995

[45] Jun. 16, 1981

[54] FUEL PUMP COUNTER TRANSFER PINION

[75] Inventor: Raymond H. Devanney, Winsted, Conn.

[73] Assignee: Veeder Industries Inc., Hartford, Conn.

[21] Appl. No.: 101,837

[22] Filed: Dec. 10, 1979

[51] Int. Cl.$^{3}$ ........................ G06C 15/42; G06C 15/26; B67D 5/22; F16H 55/18

[52] U.S. Cl. ........................ 235/139 R; 235/144 SP; 235/144 D; 74/411; 74/440

[58] Field of Search .................. 235/1 C, 94 A, 94 R, 235/139 R, 144 D, 144 R, 144 SP; 74/411, 440

[56] References Cited

U.S. PATENT DOCUMENTS

| | | | |
|---|---|---|---|
| 2,336,307 | 12/1943 | Slye | 235/139 R |
| 2,928,288 | 3/1960 | Bliss et al. | 74/411 |
| 2,932,448 | 4/1960 | Bliss | 235/144 R |
| 3,916,713 | 11/1975 | Young | 74/411 |
| 4,142,672 | 3/1979 | Smilgys | 235/144 D |

*Primary Examiner*—L. T. Hix
*Assistant Examiner*—Benjamin R. Fuller
*Attorney, Agent, or Firm*—Prutzman, Kalb, Chilton & Alix

[57] ABSTRACT

A fuel pump register cost counter having a transfer pinion permitting count transfers from the units to the tens counter wheel at a substantially predetermined maximum torque through a torsion spring connection between input and output gear sections of the transfer pinion and which prevents transfer overtravel and oscillation and provides for accurately locating the tens counter wheel.

14 Claims, 5 Drawing Figures

FUEL PUMP COUNTER TRANSFER PINION

DESCRIPTION

1. Technical Field

The present invention relates generally to fuel pump counters of the type having a bank of resettable coaxial counter wheels and intermediate transfer pinions and more particularly relates to a new and improved transfer pinion having notable use in such counters between the lowest and next lowest order counter wheels.

In fuel pump registers, because of the rapidly escalating cost of gasoline, the cost counters are being rotated at correspondingly increasing rates of speed (for any given) volume rate of fuel delivery) and whereby the increased rate of rotation of the cost counters results in substantially increased wear and impact, particularly during the count transfer interval when one or more transfer pinions and associated higher order counter wheels are accelerated from rest at the beginning of the transfer and decelerated to rest at the completion of the transfer. Accordingly, it is desirable to provide a transfer drive particularly between the lowest and next lowest order counter wheels of each cost counter of the fuel pump register for reducing the mechanical shock and attendant wear of the counter mechanism during the transfer interval.

2. Background Art

The prior art U.S. Pat. No. 2,928,288 of H. N. Bliss et al, dated Mar. 15, 1960 and entitled "Transfer Pinion For Counters" discloses a shock absorbing transfer pinion having bi-directional compression springs between input and output gear sections of the transfer pinion to reduce the transfer shock loading transmitted through the transfer pinion during the transfer interval. Similarly, prior art U.S. Pat. No. 2,336,307 of E. A. Sly, dated Dec. 7, 1943 and entitled "Counter" discloses a counter wheel drive gear with a bi-directional torsion spring for reducing the transfer drive shock transmitted through the drive gear. A third prior art U.S. Pat. No. 3,916,713 of E. T. Young, dated Nov. 4, 1975 and entitled "Snap Action Transfer Pinion", discloses a transfer pinion with a torsion spring drive preloaded during the initial part of the transfer interval and then released to produce a rapid transfer at the end of the transfer interval.

In the foregoing prior art patents, although the disclosed spring drive mechanisms provide for reducing the transfer shock at least at the beginning of the transfer interval, the disclosed mechanisms do not ensure that, under high speed operating conditions, each transfer is transmitted at a low substantially constant transfer drive rate.

DISCLOSURE OF INVENTION

In accordance with the present invention, a new and improved fuel pump counter transfer pinion is provided which transmits a low substantially constant peak transfer drive torque under high speed operating conditions and controls the transfer interval in accordance with the counter operating speed to reduce the mechanical shock and wear of the counter mechanism.

In addition, the transfer pinion of the present invention enables the transfer to be transmitted during more than one full revolution of the lower order counter wheel.

Further, the new and improved fuel pump counter transfer pinion of the present invention controls end of transfer oscillation to ensure that the transfer pinion and the higher order counter wheel are normally gradually decelerated to rest or approaching rest at the end of each transfer and then accelerated at the beginning of the succeeding transfer.

Other objects will be in part obvious and in part pointed out more in detail hereinafter.

A better understanding of the invention will be obtained from the following detailed description and the accompanying drawings of illustrative applications of the invention.

BEST MODE FOR CARRYING OUT THE INVENTION

Figure 1:
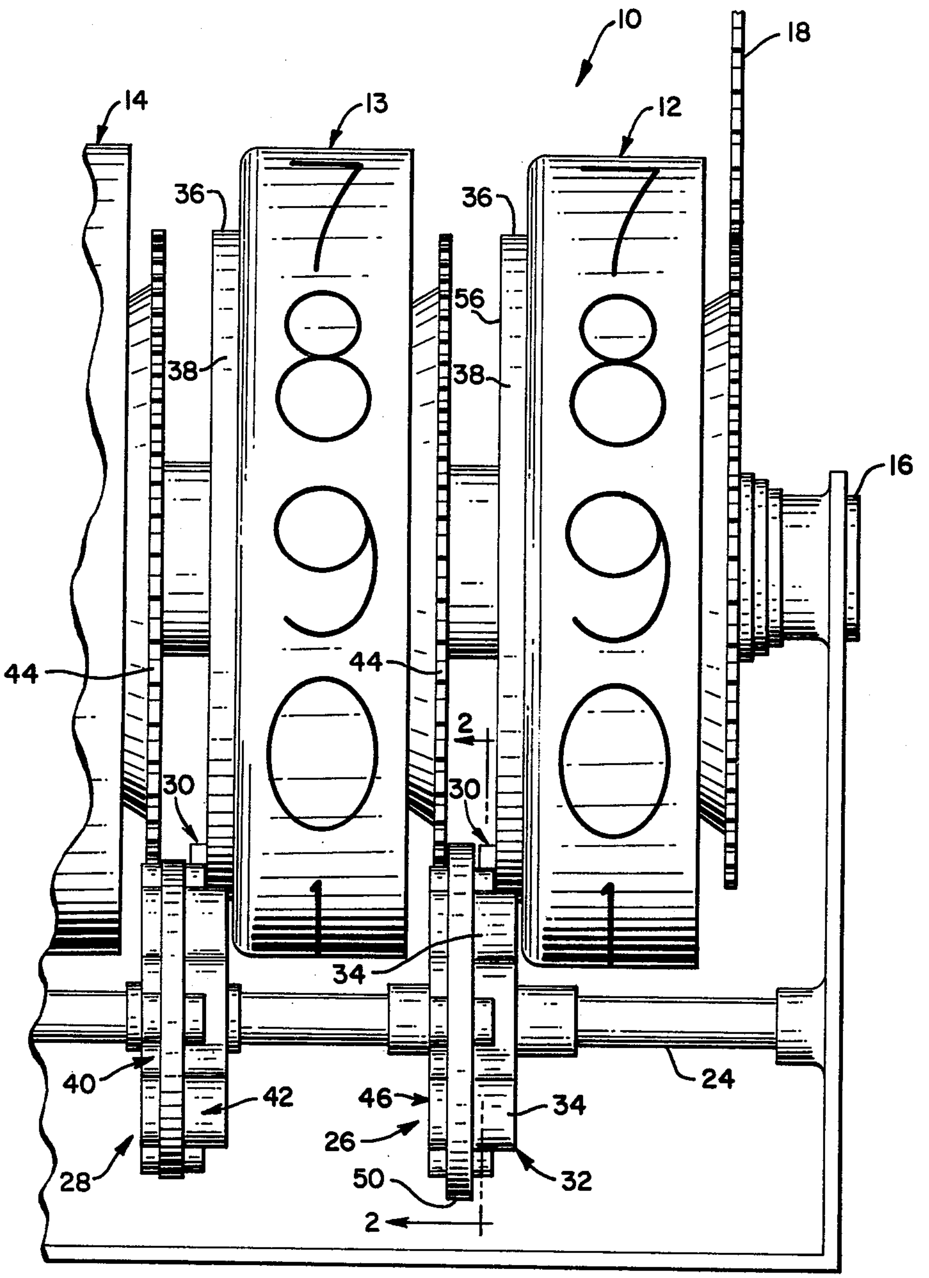
FIG. 1 is a front elevation view, partly broken away, of a fuel pump register cost counter incorporating a first embodiment of a transfer pinion of the present invention.

Referring now to the drawings in detail, wherein like reference numerals indicate like parts, there is shown a fuel pump register cost counter 10 of the type shown in U.S. Pat. No. 2,932,448 of H. N. Bliss, dated Apr. 12, 1960, and entitled "Resetting Mechanism for Counters" and may be identical to the resettable cost counter shown in U.S. Pat. No. 2,932,448 excepting as hereinafter described. Although the cost counter 10 will therefore not be described in detail, briefly, the cost counter 10 comprises a bank of four coaxial decade counter wheels (of which only three counter wheels 12–14 are shown) of increasing order of significance mounted on a counter wheel shaft 16 and adapted to be driven via a counter drive gear 18 for registering the accumulated cost amount of fuel delivered for example up to $99.99. The cost counter wheels may be identical to that shown and described in U.S. Pat. No. 4,142,672 of B. S. Smilgys, dated Mar. 6, 1979 and entitled "Counter Wheel Assembly with Improved Reset Control Mechanism".

An intermediate transfer pinion is rotatably mounted on a transfer pinion shaft 24 between each pair of adjacent counter wheels of higher and lower order for transmitting a transfer or count from each lower order wheel to the adjacent higher order counter wheel. A transfer pinion 26 constructed in accordance with the present invention is mounted between the lowest order or units decade wheel 12 and the next higher order or tens decade wheel 13, and a conventional transfer pinion 28 (only one of which being shown in FIG. 1) is mounted between each remaining pair of adjacent lower and higher order counter wheels.

Figure 2:
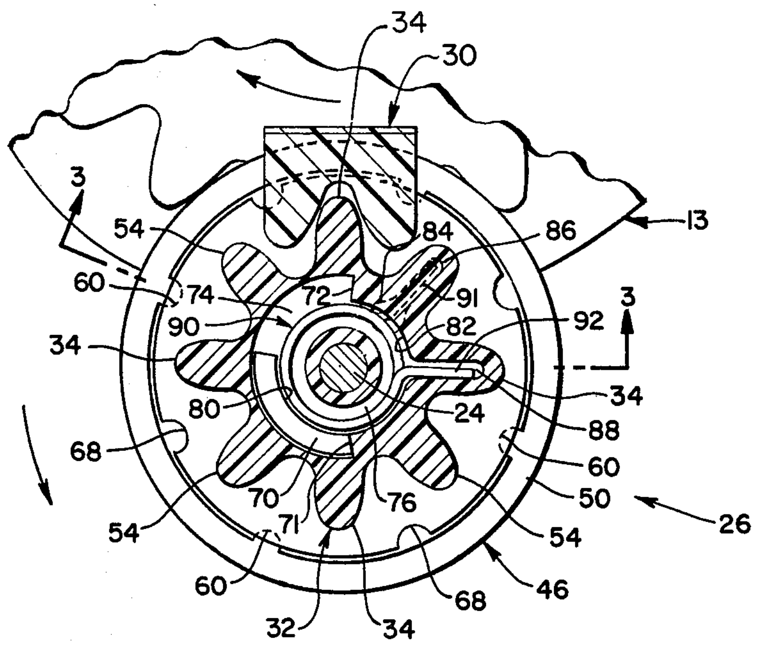
FIG. 2 is an enlarged transverse section view, partly broken away and partly in section, of the cost counter taken generally along line 2—2 of FIG. 1.

In a conventional manner, each lower order counter wheel comprises a combined locking ring and twotooth transfer gear segment 30 engageable with a mutilated, eight-tooth input or driven gear section 32 of the respective transfer pinion for indexing the input gear section 32 a predetermined transfer angle, 90° in the counterclockwise direction as viewed in FIG. 2, as the lower order counter wheel is indexed from "9" to "0" (conventionally 36°), in the clockwise direction as viewed in FIG. 2. Between transfers, alternate relatively wide teeth 34 of the mutilated, eight-tooth input gear section 32 of the transfer pinion engage the outer cylindrical surface 36 of the locking ring 38 to lock the input gear section 32 against rotation. In the conventional transfer pinion 28, an eight-tooth output or driven gear section 40 of the transfer pinion 28 is formed integrally with the input gear section 42, and whereby the next higher order decade wheel 14 is rotated by the transfer pinion 28 and via its wheel drive gear 44, one count or 36° as the adjacent lower order counter wheel 13 is rotated 36° or one count from "9" to "0", thereby to transmit a count or transfer to the higher order counter wheel 14.

Figure 3:
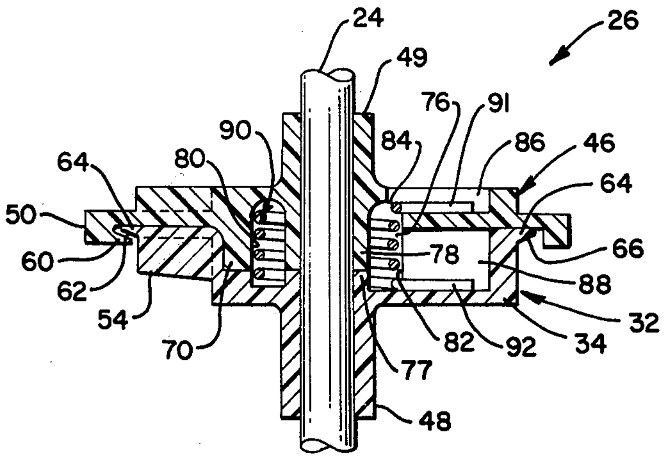
FIG. 3 is an enlarged axial section view, partly broken away and partly in section, of the cost counter taken substantially along line 3—3 of FIG. 2.

A first embodiment 26 of a transfer pinion of the present invention is shown in FIGS. 2 and 3. The input and output gear sections or parts 32, 46 respectively of the transfer pinion 26 are separately molded of for example nylon and delrin, respectively. The two molded plastic parts 32, 46 have hubs 48, 49 respectively for individually and independently rotatably mounting the two gear sections 32, 46 on the transfer pinion support shaft 24.

An annular radial flange 50 is provided on the output gear section 46 at the interface between the input and output gear sections 32, 46 to retain the assembled transfer pinion in proper axial position on the pinion shaft 24 in operative engagement with the combined locking ring and transfer segment 30 of the units or lower order decade wheel 12 and the drive gear 44 of the adjacent higher order or tens decade wheel 13. For that purpose, as seen in FIG. 1, the intermediate annular flange 50 is engageable with the side of the tens wheel drive gear 44 to limit the axial movement of the transfer pinion to the left as seen in FIG. 1. The alternate relatively narrow teeth 54 of the eight-tooth input gear section 32 of the transfer pinion 26 are engageable with a flat end face 56 of the locking ring 38 to limit the axial movement of the transfer pinion 26 in the opposite direction, to the right as viewed in FIG. 1.

The input and output gear sections 32, 46 of the transfer pinion 26 are formed with interlocking elements to prevent axial separation of the two gear parts 32, 46 and to enable the transfer pinion 26 to be preassembled before assembly of the fuel pump register. For that purpose, the annular flange 50 of the output gear section 46 is formed with a plurality of four, equiangularly spaced (i.e. 90° spaced) and radially inwardly projecting generally semicircular tangs or ears 60, each having an inner radially inwardly tapering face 62 and collectively generally defining a radially inwardly opening annulus. The input gear section 32 has an annular radial flange 64 at the interface of the two gear sections which has a radially outwardly tapering face 66 and which is received within the annulus formed by the tangs 60. Also, the radial flange 64 is formed with four equiangularly spaced (i.e. 90° spaced) generally semicircular cutouts or openings 68 for receiving the tangs 60 to permit the two transfer pinion parts 32, 46 to be assembled in face-to-face association as best shown in FIG. 3. The four cooperating tangs 60 and openings 68 are preferably angularly offset, for example as shown in FIG. 2 between alternate transfer pinion teeth, so that the two molded parts can be fitted together in a 45° angular offset relationship and then rotated 45° relative to each other in either angular direction to place the input and output gear teeth in proper angular alignment. Also, as hereinafter more fully described, the input and output gear parts 32, 46 are relatively rotatable between 90° limit positions established by the engagement of an axially projecting abutment segment 70 of the output gear part 46 with generally diametrically opposed radial shoulders 71, 72 of the input gear part 32. As indicated, in each of the 90° limit positions of the two gear parts 32, 46, the gear teeth of the two gear parts 32, 46 are in angular alignment and the two parts are held together by the interlock provided by the radial flange 64 of the input gear part 32 and the inwardly projecting tangs 60 of the output gear part 46.

As can be best seen in FIG. 2, the two transfer pinion parts 32, 46 are mounted to fit together with the abutment segment 70 of the output gear part 46 received within an enlarged generally semicircular sector opening 74 in the input gear part 32 extending between the abutment shoulders 71, 72. An internal annulus 76 is formed by both of the transfer pinion parts 32, 46 between respective axially inwardly extending and engaging hub portions 77, 78 of the two parts and the internal cylindrical surface 80 of the abutment segment 70 and an internal cylindrical surface 82 of the same diameter of the input gear part 32. The internal annulus 76 extends axially outwardly of the abutment segment 70 into the input gear part 32 and axially outwardly of the opposed faces of the two gear parts into the output gear part 46. The internal cavity which includes the internal annulus 76 and sector 74 is fully enclosed (with the two gear parts fully assembled in face-to-face relationship as shown in FIG. 3) except for an axial opening 84 in the output gear part 46 leading to an axially outwardly opening radial slot 86. A similar, but axially inwardly opening radial slot 88 is provided in the input gear part 32 within one of the four relatively long teeth 34 of the mutilated eight-tooth input gear 32.

A torsion coil spring 90 is mounted as hereinafter described in a preloaded state in the internal annulus 76 with its radially outwardly extending ends 91, 92 received in the radial slots 86, 88 respectively for locking the ends of the torsion spring to the two transfer pinion parts 32, 46. The torsion coil spring 90 has for example five or six coils with the spring ends approximately diametrically opposed in the unloaded spring state. Also, the spring coils in the unloaded spring state have an outer diameter approximately equal to but slightly less than the outer diameter of the spring annulus 76 and whereby the assembled spring 90 is retained against lateral movement in the spring annulus 76 during relative rotation of the two transfer pinion parts 32, 46.

For installing the spring 90 and preassembling the transfer pinion, either end 91, 92 of the torsion spring is inserted through the opening 84 in the output gear part 46 and then into the adjacent slot 86 and so that the coils of the spring are coaxially mounted on the output gear part 46 within its portion of the spring annulus 76. The input and output gear parts 32, 46 are then brought into opposed spaced face-to-face relationship and relatively angularly positioned to place the free end of the torsion spring 90 in the radial slot 88 of the input gear part 32. The two gear parts 32, 46 are then rotated 180° relative to each other (in the angular direction for contracting the torsion spring) to align the interlock tangs 60 of the output gear part 46 for receipt within the openings 68 of the input gear part 32. The two gear parts 32, 46 are then pressed together to complete the pinion assembly and released to permit the loaded torsion spring 90 to rotate the abutment segment 70 into engagement with the leading abutment shoulder 71. In that rest position, the torsion spring 90 is preloaded a predetermined amount dependent on its spring rate by the 135° preload rotation of the torsion spring 90, and the torsion spring bias or torque is increased by an approximately additional two-thirds by 90° relative rotation of the two gear parts rotating the abutment segment 70 into engagement with the trailing abutment shoulder 72.

In the cost counter 10 shown in FIG. 1, the counter wheels rotate upwardly as viewed from in front of the cost counter and in the counterclockwise direction as viewed in FIG. 2. The cost counter wheels of the cost counter (not shown) on the opposite side of the usual fuel pump register rotate in the opposite angular direction, downwardly as viewed from in front of the cost counter, in which event a reverse torsion spring (not shown) is used with the two molded gear parts 32, 46 for angularly biasing the two gear parts in the opposite angular direction. The transfer pinion is assembled in exactly the same manner as described except that the two parts are rotated relative to each other in the opposite angular direction (i.e. in the direction for contracting the torsion spring) to preload the torsion spring and assemble the transfer pinion.

Thus the two molded plastic gear parts 32, 46 are useful in transmitting a transfer count in either angular direction depending on the type of torsion spring used. Also, it can be seen that in the two 90° spaced limit positions of the two gear parts 32, 46, the gear teeth of the two gear parts are in angular alignment to provide the same transfer pinion drive in both angular directions.

In operation, the input gear part 32 of the transfer pinion is adapted to rotate relative to the output gear part 46 up to 90° during the transfer of a count from the units wheel 12 to the tens wheel 13. Since a count transfer is transmitted by 90° rotation of the transfer pinion 26, (i.e. an angle equal to the maximum angle of relative rotation of the two transfer pinion parts 32, 46) the input gear part 32 is adapted to be rotated a full 90° transfer angle without concomitant rotation of the output gear part 46 and tens decade wheel 13. Accordingly, a transfer to the tens decade wheel 13 can be transmitted at a relatively low rate during a full revolution of the units decade wheel 12. Also, at the completion of the transfer, the abutment segment 70 reengages the leading abutment shoulder 71 to accurately locate the tens decade wheel at a full count position (for readability and for ensuring that the tens decade wheel is properly reset when the counter 10 is reset to zero). Each tens transfer can lag up to a maximum of one full revolution of the units decade wheel 12, whereupon the abutment segment 70 is engaged by the trailing abutment shoulder 72 to provide a positive tens transfer drive from the units decade wheel 12 to the tens decade wheel 13.

By appropriate selection of the spring rate and preload of the torsion spring 90, the transfer to the tens wheel 13 is transmitted to ensure that each tens transfer is completed and the tens wheel 13 comes to a complete rest within the available full revolution of the units wheel 12, and whereby each tens transfer to the tens wheel 13 begins with the tens wheel at rest and is transmitted smoothly and with a generally constant peak torsional bias on the units wheel 12. Transfer rebound and oscillation can be effectively eliminated to substantially reduce the shock and wear on the counter mechanism and counter drive train. Also, a similar shock absorbing transfer pinion, having if desired a torsion spring with a different spring rate, can be provided between the tens and hundreds decade wheels 13, 14 for minimizing transfer shock and wear accompanying transfers to the hundreds decade wheel 14.

Figure 4:
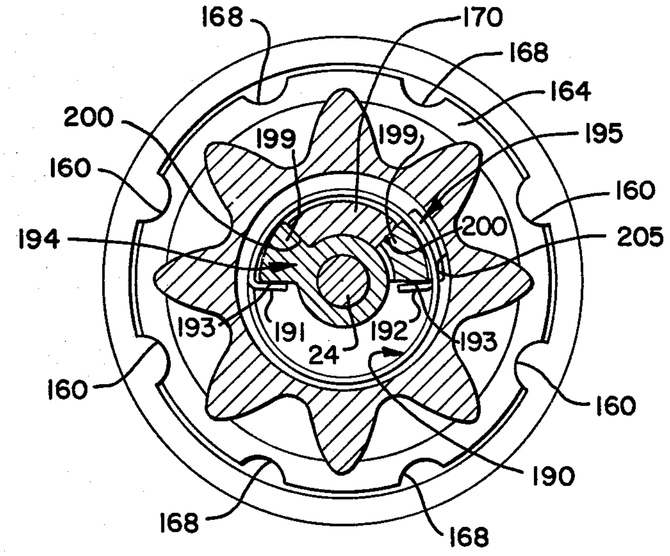
FIG. 4 is an enlarged transverse section view, partly broken away and partly in section, showing a second embodiment of a transfer pinion of the present invention.
Figure 5:
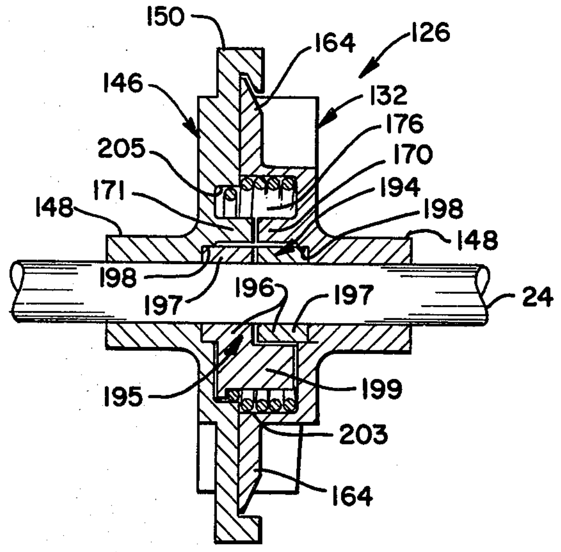
FIG. 5 is an enlarged axial section view, partly broken away and partly in section, showing the transfer pinion embodiment of FIG. 4.

Referring to FIGS. 4 and 5, a second embodiment 126 of a transfer pinion of the present invention has input and output gear sections 132, 146 which function generally like the gear sections 32, 46 respectively of the transfer pinion 26 previously described. And, as with the transfer pinion embodiment 26, the two molded plastic parts 132, 146 have individual hubs 148, 149 for individually and independently rotatably mounting the two gear sections 132, 146 on the transfer pinion support shaft 24. Also, the output gear section 146 has a radial flange 150 with radially inwardly projecting generally semicircular tangs or ears 160 which cooperate with an annular radial flange 164 of the input gear section 132 for interlocking the two parts 132, 146 as described with respect to the transfer pinion 26. However, in the transfer pinion 126, the four tangs 160 and four openings 168 are located so that the two molded parts 132, 146 can be assembled together in a 90° angular offset relationship and then rotated 90° relative to each other to their at-rest relative position shown in FIG. 4 where the gear teeth of the two gear parts are in angular alignment. Also, as hereinafter described, the input and output gear parts 132, 146 are relatively rotatable at least 180° in each angular direction from their at-rest relative position shown in FIG. 4.

The two transfer pinion parts 132, 146 together form an internal annulus 176 surrounding the transfer pinion shaft 24, and have opposed nonengaging, substantially identical abutment segments 170, 171. The abutment segments 170, 171 are in opposed axial alignment in the at-rest relative position of the two transfer pinion parts 132, 146.

A torsion coil spring 190 is mounted in the internal annulus 176 with its radially inwardly extending end tangs 191, 192 engaging outer radial edges or shoulders 193 of two separate but identical abutment pawls 194, 195 rotatably mounted within the annulus 176 on the transfer pinion shaft 24. The abutment pawls 194, 195 have aligned support hubs 196 with outer reduced cylindrical ends 197 received within reduced bores 198 in the gear parts 132, 146. Each pawl 194, 195 has an axial flange 199 axially overlapping the hub 196 of the other pawl for engagement with both corresponding radial end shoulders 200 of the abutment segment 170, 171. The torsion coil spring 190 encircles the abutment segments 170, 171 and pawls 194, 195 and the torsion spring end tangs 191, 192 engage the outer radial shoulders 193 of the pawls 194, 195 to bias the two rotatable pawls 194, 195 in opposite angular directions into engagement with the two pairs of oppositely facing shoulders 200 of the abutment segments 170, 171.

The torsion coil spring 190 has for example five or six coils with the spring end tangs 191, 192 in angular alignment in the unloaded spring state and whereby the torsion spring 190 is preloaded approximately 180° in its normal or rest position shown in FIG. 4. Also, in the unloaded spring state, the spring coils have an outer diameter approximately equal to but slightly more than the diameter of an internal cylindrical bore 203 in the input gear section 132 to retain the assembled spring 190 against substantial lateral movement during relative rotation of the two transfer pinion parts 132, 146. A smaller internal cylindrical bore 205 in the output gear part 146 is shown for axially retaining the spring coils within the larger bore 203 in the input gear part 132. Also, the two opposed pawls 194, 195 have radial end flanges 205 at their outer axial ends for axially retaining the torsion spring coils therebetween and whereby the torsion spring 190 is confined against substantial axial and radial displacement within the internal annulus 176.

For installing the torsion spring 190 and assembling the transfer pinion 126, the inut gear part 132 and the corresponding rotary abutment pawl 194 are mounted on a suitable fixture shaft (not shown) and the torsion spring 190 is mounted within the bore 203 of the input gear part 132 with its inner end tang 191 in engagement with the pawl 194 and the pawl in engagement with one shoulder 200 of the abutment segment 170. The other abutment pawl 195 is then mounted on the fixture shaft (not shown) to pick up the free end tang 192 of the coil spring 190 and rotated on the shaft, in the clockwise direction as viewed in FIG. 4, and axially shifted into engagement with the other radial shoulder 200 of the abutment segment 170. The other gear part 146 is then mounted on the fixture shaft (not shown) with its abutment segment 171 in alignment with the abutment segment 170 of the input gear part 132 and between the abutment pawls 194, 195. The two gear parts 132, 146 are then rotated 90° relative to each other in either angular direction to align the interlock tangs 160 for receipt within the interlock openings 168. The two gear parts 132, 146 are then pressed together to complete the pinion assembly and released to permit the torsion spring 190 to rotate the two gear parts 90° back into alignment as shown in FIG. 4. In that position, the two gear parts 132, 146 are normally held against relative rotation by the preload bias of the torsion spring 190 transmitted through the engagement of the abutment pawls 194, 195 with the pairs of end shoulders 200 of the abutment segments 170, 171. The torsion spring 190 is preloaded a predetermined amount dependent on its spring rate by the approximately 180° preload rotation of the torsion spring 190 and the torsion spring bias or torque is increased by approximately an additional one-half by 90° relative rotation of the two gear parts in either angular direction from their at-rest position.

The transfer pinion 126 functions in the same manner as the transfer pinion embodiment 26 previously described excepting that the two gear parts 132, 146 are relatively rotatable up to at least 180° against the bias of the preloaded torsion spring 190 in both angular directions. Accordingly, although the abutment pawls 194, 195 provide for accurately locating the at-rest relative position of the input and output gear parts 132, 146, the transfer drive is cushioned not only during the initial acceleration of the transfer drive but also during deceleration of the transfer drive at the end of the transfer interval. Therefore, the deceleration impact on the counter mechanism including the deceleration impact of the input gear section 132 with the locking ring 36 of the units counter wheel 12 is minimized by the bi-directional torsional interconnection between the input and output gear parts 132, 146. Also, the transfer pinion 126 can accumulate two full transfers by 180° relative rotation of the two gear parts 132, 146 and whereby the transfer pinion 126 is useful for example with a multiple transfer drive counter wheel (not shown). Further, the transfer pinion 126 is equally useful in both angular directions and is therefore useful in counters on both sides of fuel pump registers which rotate in opposite angular directions.

As will be apparent to persons skilled in the art, various modifications, adaptations and variations of the foregoing specific disclosure can be made without departing from the teachings of the present invention.

I claim:

1. In a resettable rotary counter having at least two coaxial resettable counter wheels of ascending order of significance adapted to be rotated in a first angular direction thereof for accumulating a count, and an intermediate rotary torque control transfer pinion having separate coaxial input and output gear sections in operative engagement with adjacent counter wheels of lower and higher order respectively for being intermittently indexed a predetermined transfer angle in one angular direction thereof, by rotation of the lower order counter wheel in said first angular direction, for indexing the higher order counter wheel one count in said first angular direction, the improvement wherein the transfer pinion comprises cooperating abutment means permitting rotation of the input gear section relative to the output gear section in at least said one angular direction from a first relative angular position thereof and engageable to accurately establish said first relative angular position, and torsion spring means angularly biasing the abutment means into engagement to angularly bias the output and input gear sections to said first relative angular position and permitting rotation of the input gear section relative to the output gear section in at least said one angular direction against the bias of the torsion spring means, the said relative rotation of the input and output gear sections being at least approximately equal to the predetermined transfer angle of the transfer pinion to permit the input gear section to be dynamically indexed said predetermined transfer angle in said one angular direction by the lower order counter wheel generally independently of the following dynamic rotation of the higher order counter wheel by the output gear section.

2. A resettable rotary counter according to claim 1 wherein the abutment means comprises first and second integral abutments on the input and output gear sections respectively and at least one rotary abutment pawl engageable with the first and second abutments of the input and output gear sections to establish their first relative angular position, the torsion spring means being connected to said one rotary abutment pawl for angularly biasing the gear sections via the one rotary abutment pawl to their first relative angular position.

3. A resettable rotary counter according to claim 1 wherein the abutment means comprises first and second integral abutment means on the input and output gear sections providing first and second angularly oppositely facing pairs of abutments, and first and second separate rotary abutment pawls engageable with the first and second pairs of abutments respectively to establish the first relative angular position of the gear sections, the torsion spring means being connected between the first and second rotary abutment pawls to bias the pawls in opposite angular directions into engagement with the first and second pairs of abutments to bias the input and output gear sections to their first relative angular position and permitting relative angular displacement thereof in each angular direction.

4. A resettable rotary counter according to claim 1, 2 or 3 wherein the torsion spring means provides a preload torsional bias on the input and output gear sections at their first relative angular position.

5. A resettable rotary counter according to claim 1 wherein the gear sections have opposed engaging annular faces and cooperate to define an internal annulus radially inwardly of the opposed annular faces, and wherein the torsion spring means comprises a coil spring section mounted within said internal annulus.

6. A resettable rotary counter according to claim 5 wherein the gear sections have axially outwardly and axially inwardly facing generally radially extending slots respectively, and wherein the torsion spring means comprises generally radially extending end tangs at the opposite ends of the coil spring section and received within the slots respectively for locking the spring ends to the gear sections respectively.

7. A transfer pinion for use in a rotary counter for transmitting a transfer count from a lower order counter wheel to an adjacent coaxial next higher order counter wheel, the transfer pinion having input and output gear sections for engagement with adjacent lower and higher order counter wheels for being intermittently indexed a predetermined transfer angle in one angular direction thereof, by rotation of the lower order counter wheel in a first angular direction thereof, for indexing the higher order counter wheel one count in said first angular direction, the improvement wherein the transfer pinion comprises cooperating abutment means permitting rotation of the input gear section relative to the output gear section in at least said one angular direction from a first relative angular position thereof and engageable to accurately establish said first relative angular position, and torsion spring means angularly biasing the abutment means into engagement to angularly bias the output and input gear sections to said first relative angular position and permitting rotation of the input gear section relative to the output gear section in at least said one angular direction against the bias of the torsion spring means, the said relative rotation of the input and output gear sections being at least approximately equal to the predetermined transfer angle of the transfer pinion to permit the input gear section to be dynamically indexed said predetermined transfer angle in said one angular direction by the lower order counter wheel generally independently of the following dynamic rotation of the higher order counter wheel by the output gear section.

8. A transfer pinion according to claim 7 wherein the abutment means comprises first and second abutment means on the input and output gear sections together providing first and second angularly oppositely facing pairs of abutments, and first and second separate rotary abutment pawls engageable with the first and second pairs of abutments respectively to establish the first relative angular position of the gear sections, the torsion spring means being connected between the first and second rotary abutment pawls to bias the pawls in opposite angular directions into engagement with the first and second pairs of abutments respectively to bias the input and output gear sections to their first relative angular position and permitting relative angular displacement thereof in each angular direction.

9. A transfer pinion according to claim 8 wherein the input and output gear sections cooperate to define an internal annulus therebetween and wherein the torsion spring means and first and second rotary abutment pawls are mounted within the internal annulus.

10. A resettable rotary counter according to claim 1 wherein the abutment means comprises cooperating abutment limit means on the input and output gear sections permitting a predetermined angle of rotation of the input gear section relative to the output gear section in said one angular direction from the first to a second relative angular position and positively engageable to accurately establish said first relative angular position, and wherein the torsion spring means interconnects the gear sections and angularly biases them in opposite angular directions into said positive engagement at said first relative angular position.

11. A resettable rotary counter according to claim 10 wherein the torsion spring means provides a preload torsional bias on the input and output gear sections at their said first relative angular position.

12. A resettable rotary counter according to claim 10 or 11 wherein the gear sections have respective axially extending hubs for rotatably mounting the gear sections of the transfer pinion and respective integral abutments radially outwardly of their respective hubs and providing said abutment limit means permitting said predetermined relative angle of rotation.

13. A resettable rotary counter according to claim 10 wherein the transfer pinion gear sections have opposed engaging annular faces and cooperate to define an internal annulus therebetween radially inwardly of the opposed annular faces, and wherein the torsion spring means comprises a coil spring section mounted within said annulus.

14. A resettable rotary counter according to claim 13 wherein the gear sections have axially outwardly and axially inwardly facing slots respectively, extending generally radially outwardly from the internal annulus and spaced axially outwardly of the respective annular face, and wherein the torsion spring means comprises generally radially outwardly extending end tangs at the opposite ends of the coil spring section and received within the slots respectively for locking the spring end tangs to the gear sections respectively.

* * * * *